US012749449B2

(12) United States Patent
Lim et al.

(10) Patent No.: US 12,749,449 B2
(45) Date of Patent: Sep. 29, 2026

(54) SUB-PIXEL, DISPLAY DEVICE INCLUDING THE SAME AND ELECTRONIC DEVICE INCLUDING THE SAME

(71) Applicant: Samsung Display Co., Ltd., Yongin-si (KR)

(72) Inventors: Jae Keun Lim, Yongin-si (KR); Cheol Min Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/215,126

(22) Filed: May 21, 2025

(65) Prior Publication Data

US 2026/0038434 A1 Feb. 5, 2026

(30) Foreign Application Priority Data

Jul. 31, 2024 (KR) ........................ 10-2024-0101791

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0819* (2013.01); *G09G 2300/0852* (2013.01); *G09G 2300/0861* (2013.01); *G09G 2310/08* (2013.01)

(58) Field of Classification Search
None
See application file for complete search history.

(56) References Cited

U.S. PATENT DOCUMENTS 11,069,292 B1 * 7/2021 Heganovic ........... G09G 3/3233
2025/0006109 A1 * 1/2025 Ha ........................... G09G 3/32
2025/0118254 A1 4/2025 Lim et al.

FOREIGN PATENT DOCUMENTS

KR 10-2025-0051862 A 4/2025

* cited by examiner

*Primary Examiner* — Christopher J Kohlman
(74) *Attorney, Agent, or Firm* — Womble Bond Dickinson (US) LLP

(57) ABSTRACT

A sub-pixel includes: a first transistor including a control electrode connected to a first node, the first transistor being connected between a second node and a third node configured to receive a first power voltage, and configured to generate driving current; a first capacitor connected between the first node and the second node; a second capacitor connected between the second node and a fourth node configured to receive an initialization voltage; a second transistor configured to provide a data voltage to the first node in response to a first gate signal; and a light emitting element configured to receive the driving current and emit light, and including a first electrode connected to the fourth node, and a second electrode configured to receive a second power voltage.

20 Claims, 10 Drawing Sheets

SUB-PIXEL, DISPLAY DEVICE INCLUDING THE SAME AND ELECTRONIC DEVICE INCLUDING THE SAME

CROSS-REFERENCE TO RELATED APPLICATION

The present application claims priority to and the benefit of Korean Patent Application No. 10-2024-0101791, filed on Jul. 31, 2024, in the Korean Intellectual Property Office, the entire disclosure of which is incorporated herein by reference.

BACKGROUND

1. Field

Aspects of some embodiments of the present disclosure relate to a sub-pixel, a display device including the sub-pixel, and an electronic device including the sub-pixel.

2. Description of the Related Art

With the development of information technology, the importance of display devices as a medium for connecting users and information has been emphasized. Owing to the importance of display devices, the use of various kinds of display devices, such as liquid crystal display devices and organic light emitting display devices, has increased.

Recently, there has been development in head-mounted display devices (HMDs). Head-mounted display devices (HMDs) are display devices, which allow a user to wear in the form of glasses or a helmet, and are used to create virtual reality (VR) or augmented reality (AR) experiences where the focus is formed at a close distance in front of the eyes of the user. Head-mounted display devices may employ high-resolution panels, and may have pixels that are applicable to high-resolution panels and may be relatively insensitive to noise.

The above information disclosed in this Background section is only for enhancement of understanding of the background and therefore the information discussed in this Background section does not necessarily constitute prior art.

SUMMARY

Aspects of some embodiments of the present disclosure are directed to a sub-pixel that is relatively insensitive to noise, a display device including the sub-pixel, and an electronic device including the sub-pixel.

According to some embodiments of the present disclosure, a sub-pixel includes: a first transistor including a control electrode connected to a first node, the first transistor being connected between a second node and a third node that receives a first power voltage, and configured to generate driving current; a first capacitor connected between the first node and the second node; a second capacitor connected between the second node and a fourth node configured to receive an initialization voltage; a second transistor configured to provide a data voltage to the first node in response to a first gate signal; and a light emitting element configured to receive the driving current and emit light, and including a first electrode connected to the fourth node, and a second electrode configured to receive a second power voltage.

According to some embodiments, the sub-pixel may further include a third transistor configured to provide a reference voltage to the control electrode of the first transistor in response to a second gate signal.

According to some embodiments, the sub-pixel may further include a fourth transistor configured to provide the initialization voltage to the fourth node in response to a third gate signal.

According to some embodiments, the sub-pixel may further include: a fifth transistor configured to provide the first power voltage to the third node in response to an emission signal; and a sixth transistor configured to connect the second node to the fourth node in response to an emission bias signal.

According to some embodiments, each of the first to fourth transistors may include an n-channel metal oxide semiconductor (NMOS) transistor, and each of the fifth and sixth transistors may include a p-channel metal oxide semiconductor (PMOS) transistor.

According to some embodiments, each of the first to third transistors may include an n-channel metal oxide semiconductor (NMOS) transistor, and each of the fourth to sixth transistors may include a p-channel metal oxide semiconductor (PMOS) transistor.

According to some embodiments, during a period between a first time point after the data voltage is provided to the first node and a second time point before the light emitting element emits light, both the first electrode and the second electrode of the second capacitor may have the initialization voltage. According to some embodiments, the second time point may follow the first time point.

According to some embodiments, one frame may include a non-emission period and an emission period. According to some embodiments, the non-emission period may include an addressing period in which the data voltage is provided to the first node, and an emission initialization period following the addressing period. According to some embodiments, in the emission initialization period, both the first electrode of and the second electrode of the second capacitor may have the initialization voltage.

According to some embodiments, during the emission initialization period, each of the third gate signal and the emission bias signal may have an enable level, and each of the first gate signal, the second gate signal, and the emission signal may have a disable level.

According to some embodiments, during the addressing period, each of the first gate signal and the third gate signal may have an enable level, and each of the second gate signal, the emission signal, and the emission bias signal may have a disable level.

According to some embodiments, the non-emission period may further include an initialization period and a compensation period following the initialization period. According to some embodiments, during the initialization period, each of the second gate signal, the third gate signal, and the emission bias signal may have an enable level, and each of the first gate signal and the emission signal may have a disable level. According to some embodiments, the addressing period may follow the compensation period.

According to some embodiments, during the compensation period, each of the second gate signal, the third gate signal, and the emission signal may have an enable level, and each of the first gate signal and the emission bias signal may have a disable level.

Aspects of some embodiments of the present disclosure include a display device, including: a display panel including a sub-pixel; and a display panel driver configured to drive the display panel. According to some embodiments, the sub-pixel may include: a first transistor including a control electrode connected to a first node, the first transistor being connected between a second node and a third node that receives a first power voltage, and configured to generate driving current; a first capacitor connected between the first node and the second node; a second capacitor connected between the second node and a fourth node configured to receive an initialization voltage; a second transistor configured to provide a data voltage to the first node in response to a first gate signal; and a light emitting element configured to receive the driving current and emit light, and including a first electrode connected to the fourth node, and a second electrode configured to receive a second power voltage.

According to some embodiments, the sub-pixel may further include: a third transistor configured to provide a reference voltage to the control electrode of the first transistor in response to a second gate signal; and a fourth transistor configured to provide the initialization voltage to the fourth node in response to a third gate signal.

According to some embodiments, the sub-pixel may further include: a fifth transistor configured to provide the first power voltage to the third node in response to an emission signal; and a sixth transistor configured to connect the second node to the fourth node in response to an emission bias signal.

According to some embodiments, one frame may include a non-emission period and an emission period. According to some embodiments, the non-emission period may include an addressing period in which the data voltage is provided to the first node, and an emission initialization period following the addressing period. According to some embodiments, in the emission initialization period, both the first electrode of and the second electrode of the second capacitor may have the initialization voltage.

According to some embodiments, during the emission initialization period, each of the third gate signal and the emission bias signal may have an enable level, and each of the first gate signal, the second gate signal, and the emission signal may have a disable level.

According to some embodiments, during the addressing period, each of the first gate signal and the third gate signal may have an enable level, and each of the second gate signal, the emission signal, and the emission bias signal may have a disable level.

According to some embodiments, the non-emission period may further include an initialization period and a compensation period following the initialization period. According to some embodiments, during the initialization period, each of the second gate signal, the third gate signal, and the emission bias signal may have an enable level, and each of the first gate signal and the emission signal may have a disable level. According to some embodiments, the addressing period may follow the compensation period.

According to some embodiments, during the compensation period, each of the second gate signal, the third gate signal, and the emission signal may have an enable level, and each of the first gate signal and the emission bias signal may have a disable level.

DETAILED DESCRIPTION

Figure 1:
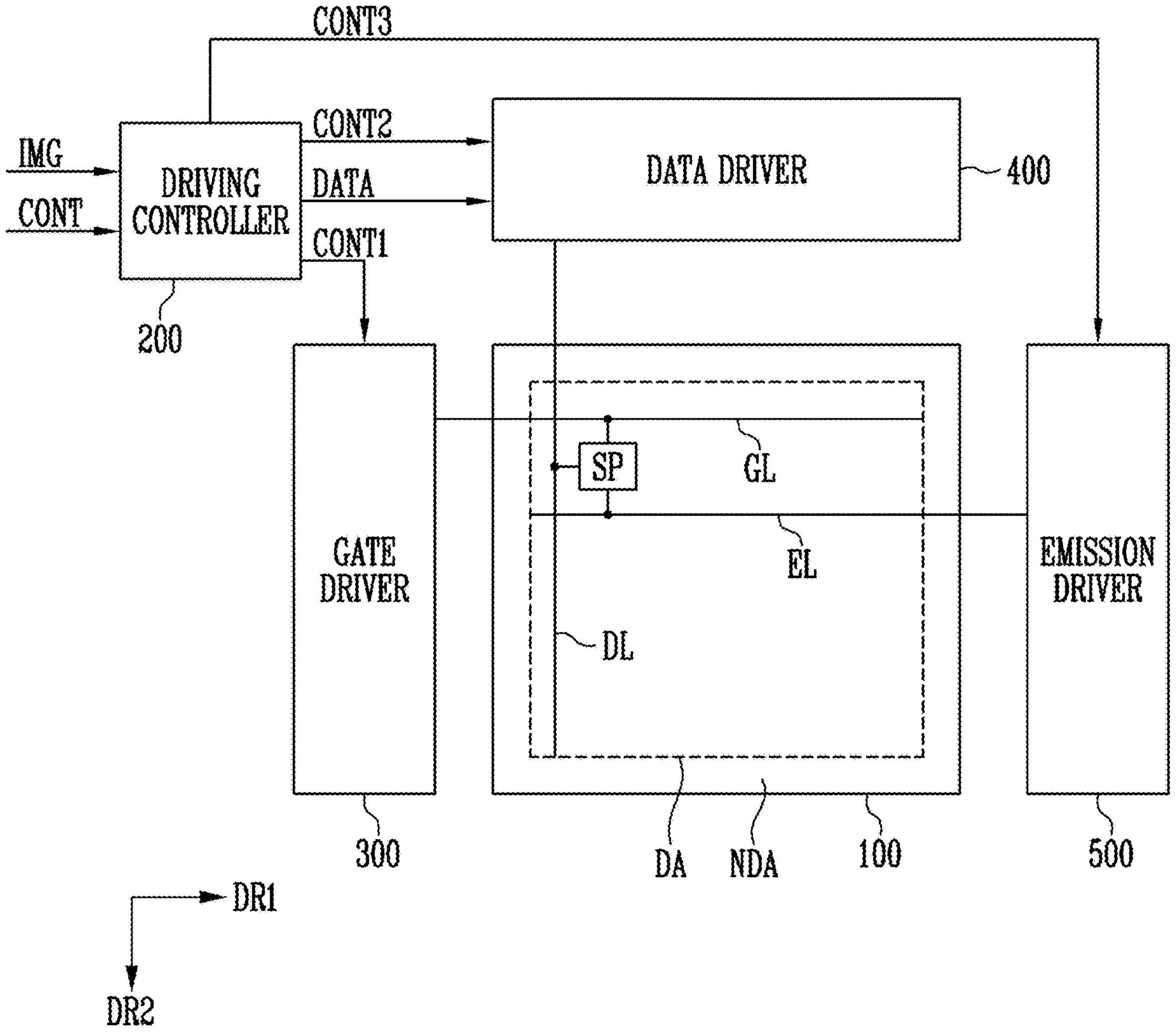
FIG. 1 is a block diagram illustrating a display device according to some embodiments of the present disclosure.

Hereinafter, aspects of some embodiments of the present invention will be described in more detail with reference to the attached drawings. In the following description, only parts required for understanding of operations in accordance with the present disclosure will be described, and explanation of the other parts will be omitted not to make the gist of the present disclosure unclear. Accordingly, the present disclosure is not limited to the embodiments set forth herein but may be embodied in other types. Rather, these embodiments are provided so that the present disclosure will be thorough and complete, and will fully convey the technical spirit of the disclosure to those skilled in the art.

It will be understood that when an element is referred to as being “coupled” or “connected” to another element, it can be directly coupled or connected to the other element or intervening elements may be present therebetween. The terminology used herein is for the purpose of describing particular embodiments only and is not intended to be limiting. In the specification, when an element is referred to as “comprising” or “including” a component, it does not preclude another component but may further include other components unless the context clearly indicates otherwise. “at least one of X, Y, and Z” and “at least one selected from the group consisting of X, Y, and Z” may be construed as X only, Y only, Z only, or any combination of two or more of X, Y, and Z (for instance, XYZ, XYY, YZ, and ZZ). As used herein, the term “and/or” can include any and all combinations of one or more of the associated listed items.

Although the terms “first,” “second,” etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as “beneath,” “below,” “under,” “lower,” “above,” “upper,” “over,” “higher,” “side” (e.g., as in “sidewall”), and the like, may be used herein for descriptive purposes, and, thereby, to describe one element or feature’s relationship to another element(s) or feature(s), as illustrated in the drawings. Spatially relative terms are intended to encompass different orientations of an apparatus in use, operation, and/or manufacture in addition to the orientation depicted in the drawings. For example, if the device in the drawings is turned upside down, elements described as “below” or “beneath” other elements or features would then be oriented “above” the other elements or features. Thus, the term “below” can encompass both an orientation of above and below. Furthermore, the device may be otherwise oriented (e.g., rotated 90 degrees or at other orientations), and, as such, the spatially relative descriptors used herein interpreted accordingly.

Aspects of some embodiments will be described in more detail with reference to diagrams illustrating idealized embodiments. As such, variations from the shapes of the illustrations as a result, for example, of manufacturing techniques and/or tolerances, are to be expected. Therefore, embodiments disclosed herein should not be construed as limited to the particular illustrated shapes of regions, but are to include deviations in shapes that result from, for instance, manufacturing. As such, the shapes illustrated in the drawings may not illustrate the actual shapes of regions of a device, and, as such, are not intended to be limiting.

FIG. 1 is a block diagram illustrating a display device according to some embodiments of the present disclosure.

Referring to FIG. 1, the display device may include a display panel 100 and a display panel driver. The display panel driver may include a driving controller 200, a gate driver 300, a data driver 400, and an emission driver 500. According to some embodiments, the driving controller 200 and the data driver 400 may be integrated into a single chip.

The display panel 100 may include a display area DA formed to display an image, and a non-display area NDA located adjacent to (e.g., in a periphery or outside a footprint of) the display area DA. According to some embodiments, the gate driver 300 and the emission driver 500 may be mounted in the non-display area NDA.

The display panel 100 may include a plurality of gate lines GL, a plurality of data lines DL, and a plurality of emission lines EL, and a plurality of sub-pixels SP electrically connected to the gate lines GL, the data lines DL, and the emission lines EL. The gate lines GL and the emission lines EL may extend in a first direction DR1. The data lines DL may extend in a second direction DR2 that intersects with the first direction DR1. Although FIG. 1 illustrates a single sub-pixel SP, a single data line DL, a single emission line EL, and a single gate line GL, for simplicity of illustration, as a person having ordinary skill in the art would appreciate, the display panel 100 may include any suitable number of sub-pixels SP, data lines DL, emission lines EL, and gate lines GL, according to the design and size of the display panel 100.

The driving controller 200 may receive input image data IMG and an input control signal CONT from a main processor {e.g., a graphic processing unit (GPU)}. For example, the input image data IMG may include red image data, green image data, and blue image data. According to some embodiments, the input image data IMG may further include white image data. According to some embodiments, the input image data IMG may include magenta image data, yellow image data, and cyan image data. The input control signal CONT may include a master clock signal and a data enable signal. The input control signal CONT may include a vertical synchronization signal and a horizontal synchronization signal.

The driving controller 200 may generate a first control signal CONT1, a second control signal CONT2, and a data signal DATA, based on the input image data IMG and the input control signal CONT.

The driving controller 200 may generate the first control signal CONT1 for controlling the operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling the operation of the data driver 400 based on the input control signal CONT, and output the second control signal CONT2 to the gate driver 300. The second control signal CONT2 may include a horizontal start signal and a load signal.

The driving controller 200 may receive the input image data IMG and the input control signal CONT and generate the data signal DATA. The driving controller 200 may output the data signal DATA to the data driver 400.

The driving controller 200 may generate the third control signal CONT3 for controlling the operation of the emission driver 500 based on the input control signal CONT and output the third control signal CONT3 to the emission driver 500. The third control signal CONT3 may include a vertical start signal and an emission clock signal.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages by converting the data signal DATA into analog voltages. The data driver 400 may output the data voltages to the data lines DL.

The emission driver 500 may generate emission signals for driving the emission lines EL in response to the third control signal CONT3 received from the driving controller 200. The emission driver 500 may output the emission signals to the emission lines EL. For example, the emission driver 500 may sequentially output the emission signals to the emission lines EL.

According to some embodiments, the emission driver 500 may generate emission bias signals (EMB in FIG. 2) for driving the emission lines EL, and output the emission bias signals (EMB in FIG. 2) to the emission lines EL.

Figure 2:
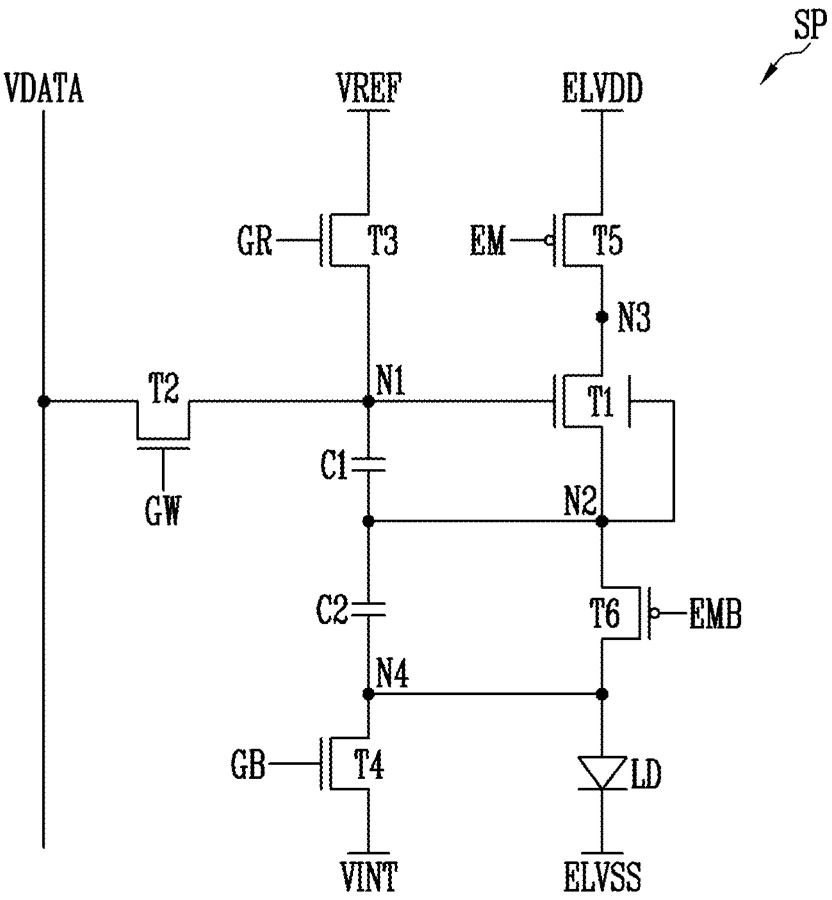
FIG. 2 is a circuit diagram illustrating an example of a sub-pixel of the display device of FIG. 1.

FIG. 2 is a circuit diagram illustrating an example of a sub-pixel SP of the display device of FIG. 1. Although FIG. 2 illustrates various components in a sub-pixel according to some embodiments, embodiments according to the present disclosure are not limited thereto, and according to various embodiments, the sub-pixel may include additional components or fewer components without departing from the spirit and scope of embodiments according to the present disclosure.

Referring to FIG. 2, the sub-pixel SP may include a light emitting element LD, and a pixel circuit configured to control the amount of current to be supplied to the light emitting element LD.

Figure 4:
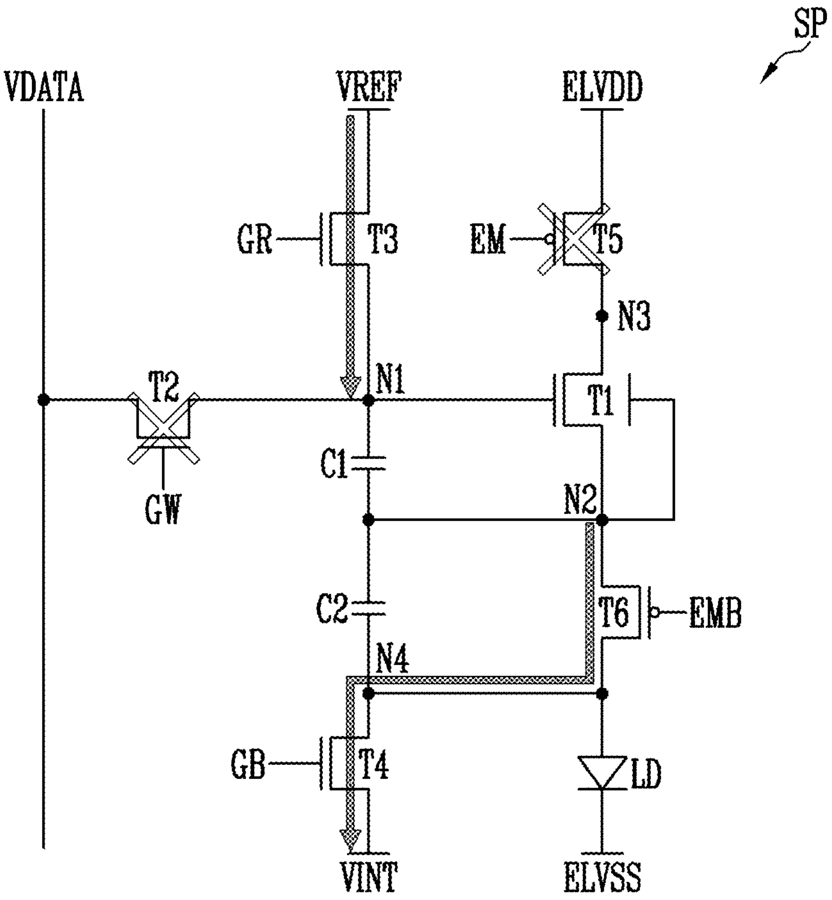
FIGS. 4 to 7 are circuit diagrams illustrating an operation process of the sub-pixel in response to signals of FIG. 3.

An organic light emitting diode may be selected as the light emitting element LD. Furthermore, an inorganic light emitting diode such as a micro light emitting diode (LED) or a quantum dot light emitting diode may be selected as the light emitting element LD. The light emitting element LD may be an element formed of a combination of organic material and inorganic material. Although FIG. 4 illustrates that the pixel PXij includes a single light emitting element LD, the pixel PXij according to some embodiments may include a plurality of light emitting elements LD. The plurality of light emitting elements LD may be connected in series, parallel or series-parallel to each other.

The sub-pixel SP may include a first transistor T1 (e.g., a driving transistor), a first capacitor C1, a second capacitor C2, a second transistor T2, and a light emitting element LD. The first transistor T1 may generate driving current. The first capacitor C1 may include a first electrode connected to a control electrode of the first transistor T1, and a second electrode connected to a second electrode of the first transistor T1. The second capacitor C2 may include a first electrode connected to the second electrode of the first transistor T1, and a second electrode. The second transistor T2 may provide a data voltage VDATA to the first electrode of the first capacitor C1 in response to a first gate signal GW. The light emitting element LD may receive the driving current and emit light.

The sub-pixel SP may further include a third transistor T3 configured to provide a reference voltage VREF to the control electrode of the first transistor T1 in response to a second gate signal GR, and a fourth transistor T4 configured to provide an initialization voltage VINT to a first electrode of the light emitting element LD in response to a third gate signal GB.

The initialization voltage VINT may have a voltage value causing the light emitting element LD to be turned off when supplied to the first electrode of the light emitting element LD. The reference voltage VREF may be greater than the initialization voltage VINT.

The sub-pixel SP may further include a fifth transistor T5 configured to provide a first power voltage ELVDD to the first transistor T1 in response to an emission signal EM, and a sixth transistor T6 configured to connect the second electrode of the first transistor T1 to the first electrode of the light emitting element LD in response to an emission bias signal EMB.

For example, the first transistor T1 may include the control electrode connected to a first node N1, a first electrode connected to a third node N3 to receive the first power voltage ELVDD (e.g., a high power voltage), and the second electrode connected to a second node N2. In other words, the first transistor T1 may be connected between the second node N2 and the third node N3.

The second transistor T2 may include a control electrode configured to receive a first gate signal GW, a first electrode configured to receive the data voltage VDATA, and a second electrode connected to the first node N1.

The third transistor T3 may include a control electrode configured to receive a second gate signal GR, a first electrode configured to receive the reference voltage VREF, and a second electrode connected to the first node N1.

The fourth transistor T4 may include a control electrode configured to receive a third gate signal GB, a first electrode connected to a fourth node N4, and a second electrode configured to receive the initialization voltage VINT.

The fifth transistor T5 may include a control electrode configured to receive an emission EM, a first electrode configured to receive the first power voltage ELVDD, and a second electrode connected to the third node N3.

The sixth transistor T6 may include a control electrode configured to receive an emission bias signal EMB, a first electrode connected to the second node N2, and a second electrode connected to the fourth node N4.

The first capacitor C1 may include the first electrode connected to the first node N1, and the second electrode connected to the second node N2. The second capacitor C2 may include the first electrode connected to the second node N2, and the second electrode connected to the fourth node N4. In other words, the first capacitor C1 may be connected between the first node N1 and the second node N2. The second capacitor C2 may be connected between the second node N2 and the fourth node N4.

The light emitting element LD may include the first electrode (e.g., an anode electrode) connected to the fourth node N4, and a second electrode configured to receive a second power voltage ELVSS (e.g., a low power voltage).

According to some embodiments, the first transistor T1 may further include a back gate electrode connected to the second node N2. However, the present disclosure is not limited to the aforementioned example.

Each of the first to fourth transistors T1 to T4 may be implemented using an n-channel metal oxide semiconductor (NMOS) transistor. In this case, a low voltage level may be a disable level, and a high voltage level may be an enable level. For example, if a signal applied to the control electrode of the NMOS transistor has a low voltage level, the NMOS transistor may be turned off. For example, if a signal applied to the control electrode of the NMOS transistor has a high voltage level, the NMOS transistor may be turned on.

Each of the fifth and sixth transistors T5 and T6 may be implemented using a p-channel metal oxide semiconductor (PMOS) transistor. In this case, a low voltage level may be an enable level, and a high voltage level may be a disable level. For example, if a signal applied to a control electrode of the PMOS transistor has a low voltage level, the PMOS transistor may be turned on. For example, if a signal applied to the control electrode of the PMOS transistor has a high voltage level, the PMOS transistor may be turned off. In other words, the enable level and the disable level may be determined based on the type of transistor.

However, embodiments according to the present disclosure are not limited to the aforementioned example. For example, each of the first to fourth transistors T1 to T4 may be implemented using a PMOS transistor, while each of the fifth and sixth transistors T5 and T6 may be implemented using an NMOS transistor. In other words, each of the first to sixth transistors T1 to T6 may be implemented using one of the PMOS transistor and the NMOS transistor.

Figure 3:
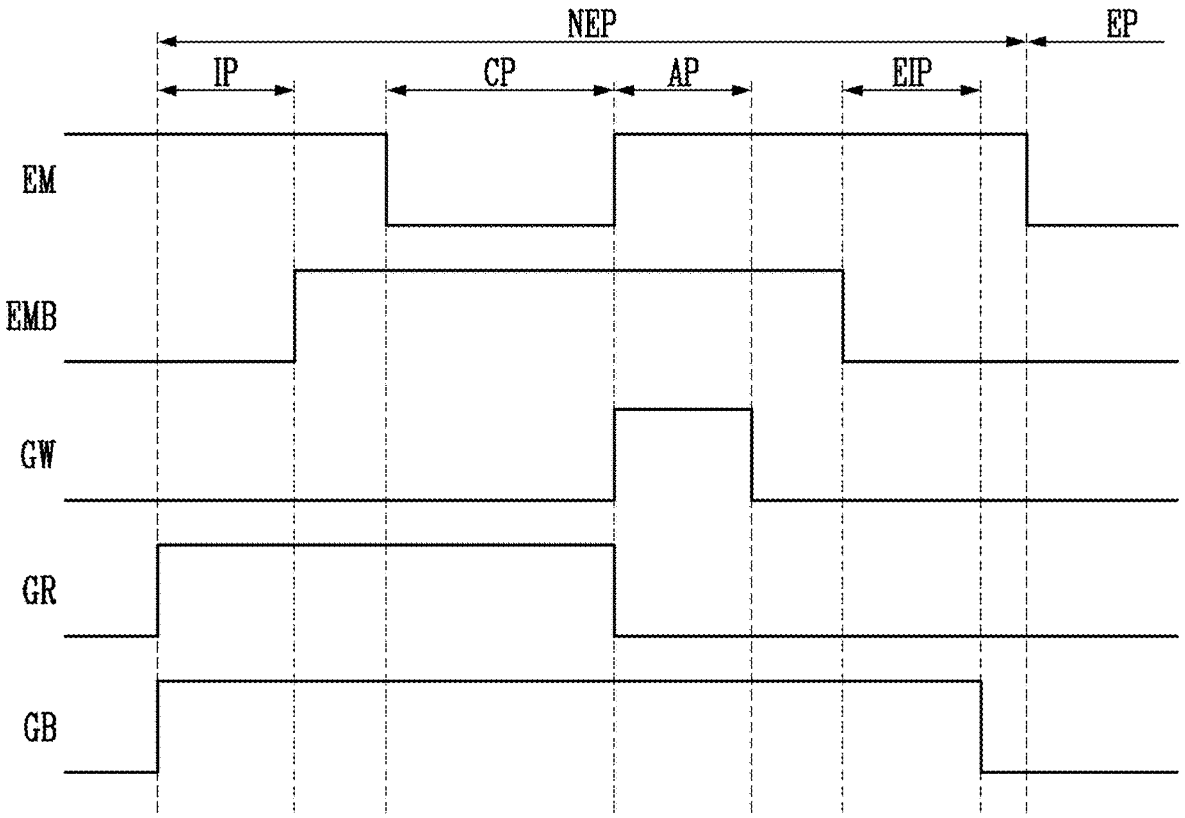
FIG. 3 is a timing diagram illustrating an example of driving the sub-pixel shown in FIG. 2 in the display device.

FIG. 3 is a timing diagram illustrating an example of driving the sub-pixel shown in FIG. 2 in the display device. FIGS. 4 to 7 are circuit diagrams illustrating an operation process of the sub-pixel in response to signals of FIG. 3.

Referring to FIG. 3, one frame may include a non-emission period NEP and an emission period EP. For example, the light emitting element LD may emit light during the emission period EP. The non-emission period NEP may include an initialization period IP, a compensation period CP, an addressing period AP, and an emission initialization period EIP.

Referring to FIGS. 3 and 4, during the initialization period IP in one frame, the second gate signal GR, the third gate signal GB, and the emission bias signal EMB may each have an enable level, and the third, fourth, and sixth transistors T3, T4, and T6 may be turned on. Furthermore, during the initialization period IP, the first gate signal GW and the emission signal EM may each have a disable level, and the second and fifth transistors T2 and T5 may be turned off.

Hence, the voltage of the first node N1 may correspond to VREF, and the voltage of each of the second and fourth nodes N2 and N4 may correspond to VINT. In other words, the first and second capacitors C1 and C2 may be initialized. Here, VREF denotes the reference voltage VREF, and VINT denotes the initialization voltage VINT, and this remains the same below.

Figure 5:
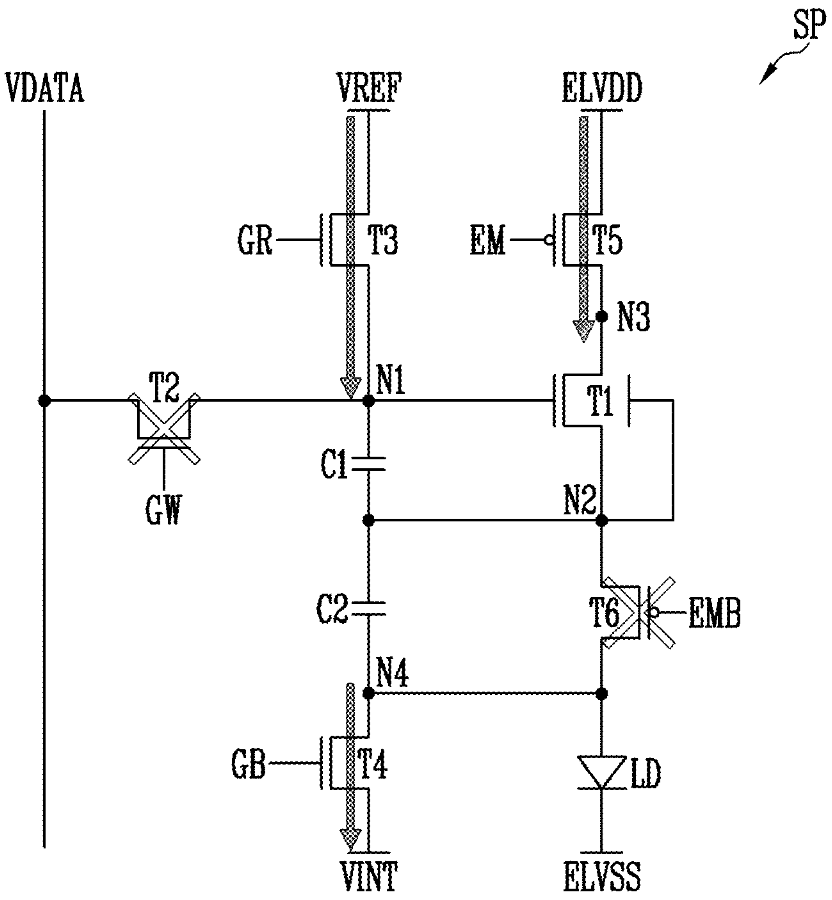

Referring to FIGS. 3 and 5, during the compensation period CP following the initialization period IP in one frame, the second gate signal GR, the third gate signal GB, and the emission signal EM may each have an enable level, and the third to fifth transistors T3, T4, and T5 may be turned on. Furthermore, during the compensation period CP, the first gate signal GW and the emission bias signal EMB may each have a disable level, and the second and sixth transistors T2 and T6 may be turned off.

Hence, the voltage of the first node N1 may correspond to VREF, and the voltage of the second node N2 may correspond to VREF-VTH. In other words, as a voltage corresponding to VTH is stored in the first capacitor C1, the threshold voltage of the first transistor T1 may be compensated for in the emission period EP. Here, VTH denotes the threshold voltage of the first transistor T1, and this remains the same below.

Figure 6:
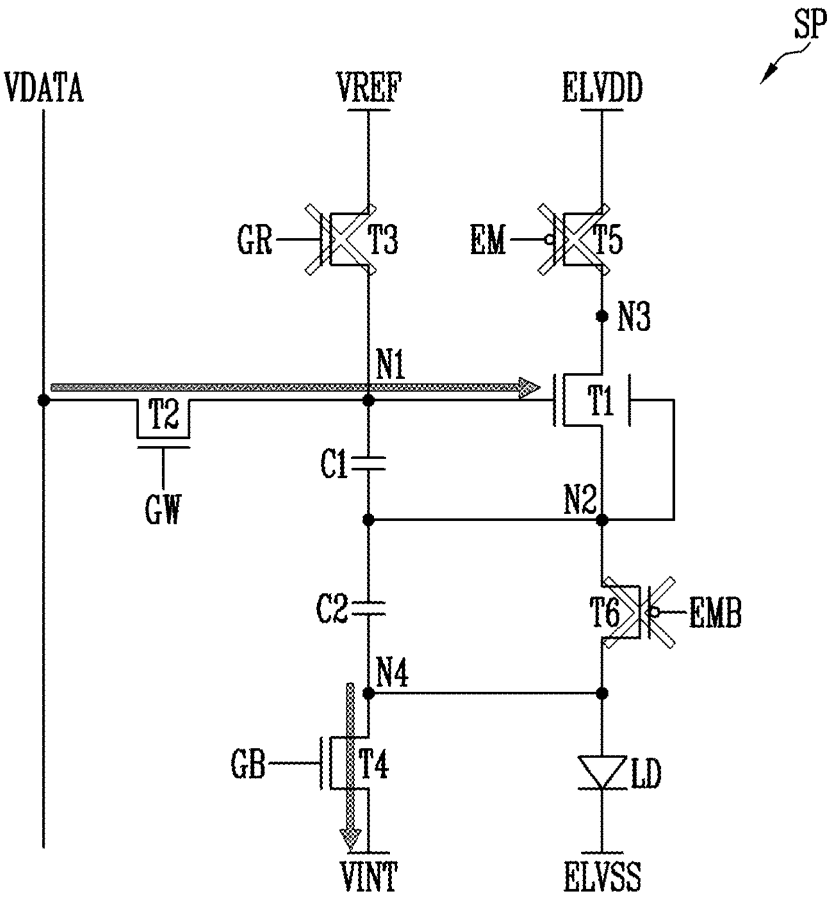

Referring to FIGS. 3 and 6, during the addressing period AP following the compensation period CP in one frame, the first gate signal GW and the third gate signal GB may each have an enable level, and the second and fourth transistors T2 and T4 may be turned on. Furthermore, during the addressing period AP, the second gate signal GR, the emission signal EM, and the emission bias signal EMB may each have a disable level, and the fifth and sixth transistors T5 and T6 may be turned off.

Hence, the voltage of the first node N1 may correspond to VDATA, the voltage of the second node N2 may correspond to VREF−VTH+α(VDATA−VREF), and the voltage of the fourth node N4 may be VINT. Here, α may correspond to c1/(c1+c2), c1 may denote a capacitance value of the first capacitor C1, and c2 may denote a capacitance value of the second capacitor C2. In other words, the data voltage VDATA may be written to the first and second capacitors C1 and C2.

Figure 7:
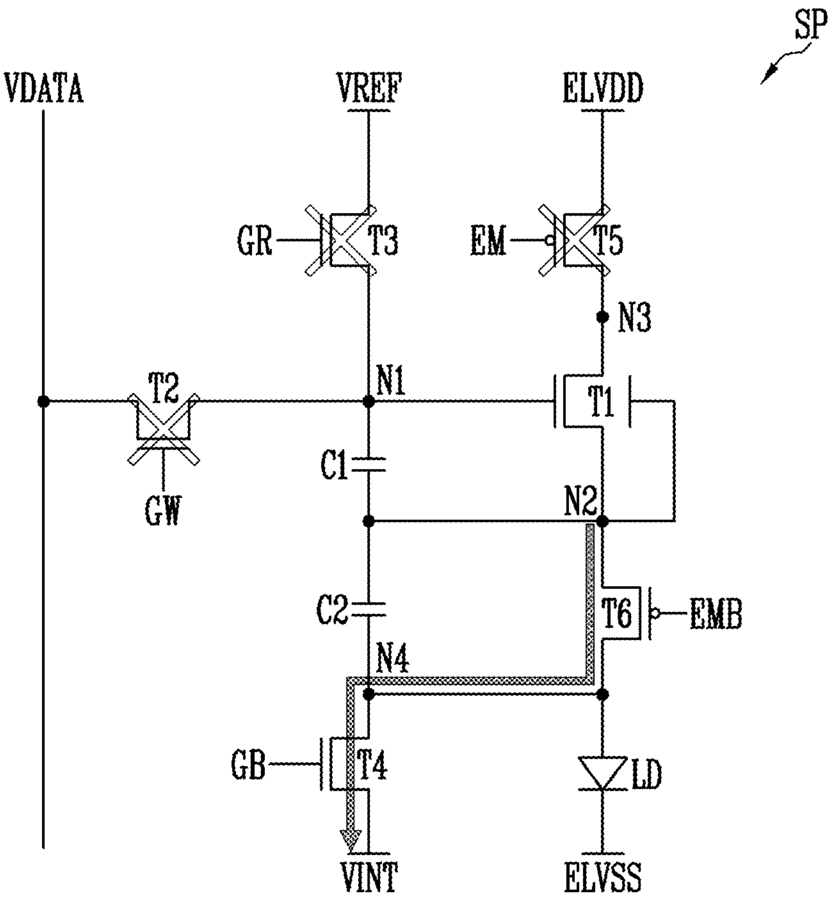

Referring to FIGS. 3 and 7, during the emission initialization period EIP following the addressing period AP in one frame, each of the third gate signal GB and the emission bias signal EMB may have an enable level, and the fourth and sixth transistors T4 and T6 may be turned on. Furthermore, in the emission initialization period EIP, the first gate signal GW, the second gate signal GR, and the emission signal EM may each have a disable level, and the second, third, and fifth transistors T2, T3, and T5 may be turned off.

Here, because the fourth transistor T4 and the sixth transistor T6 are set to a turn-on state, the initialization voltage VINT may be supplied to the second node N2 and the fourth node N4.

In other words, during a period between a first time point after the data voltage VDATA is provided and a second time point before the light emitting element LD emits light, both the first electrode and the second electrode of the second capacitor C2 may have the initialization voltage VINT. The first time point may be a time point in the addressing period AP, while the second time point may be a time point in the emission initialization period EIP.

That is, during the emission initialization period EIP after the data voltage VDATA is provided, both the first electrode and the second electrode of the second capacitor C2 may have the initialization voltage VINT. Accordingly, because the second capacitor C2 is short-circuited, the influence of the second capacitor C2 may be removed during the emission initialization period EIP and the emission period EP after the emission initialization period EIP.

Referring to FIG. 3, during the emission period EP, each of the emission signal EM and the emission bias signal EMB may have an enable level, and the fifth and sixth transistors T5 and T6 may be turned on. The first transistor T1 may generate driving current corresponding to a gate-source voltage (i.e., a voltage between the first node N1 and the second node N2).

As the second capacitor C2 connected between the second node N2 and the fourth node N4 is short-circuited in the emission initialization period EIP, each of the second node N2 and the fourth node N4 during the emission period EP may maintain the previously stored voltage without being affected by the second capacitor C2. Accordingly, the sub-pixel SP may be provided to be relatively insensitive to noise caused by the second capacitor C2 and capable of accurate grayscale representation.

Figure 8:
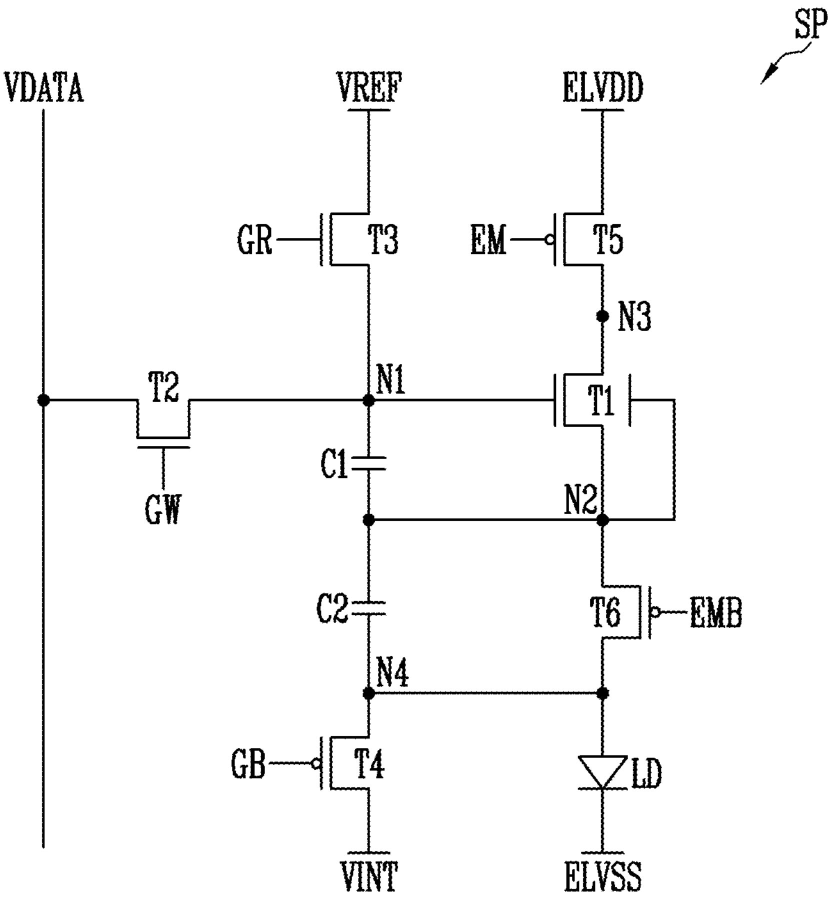
FIG. 8 is a circuit diagram illustrating another example of a sub-pixel of the display device of FIG. 1.

FIG. 8 is a circuit diagram illustrating another example of a sub-pixel SP of the display device of FIG. 1. Although FIG. 8 illustrates various components in a sub-pixel according to some embodiments, embodiments according to the present disclosure are not limited thereto, and according to various embodiments, the sub-pixel may include additional components or fewer components without departing from the spirit and scope of embodiments according to the present disclosure.

Referring to FIG. 8, the sub-pixel SP may include a light emitting element LD, and a pixel circuit configured to control the amount of current to be supplied to the light emitting element LD.

The configuration of the sub-pixel SP according to the present embodiments is substantially the same as that of the sub-pixel SP of FIG. 2, other than the fourth transistor T4; therefore, identical or similar components are denoted by the same reference numerals and symbols, and some redundant explanation thereof may be omitted.

The third transistor T3 may include a control electrode configured to receive the second gate signal GR, a first electrode configured to receive the reference voltage VREF, and a second electrode connected to the first node N1.

Each of the first to third transistors T1, T2, and T3 may be implemented using an NMOS transistor. In this case, a low voltage level may be a disable level, and a high voltage level may be an enable level. For example, if a signal applied to the control electrode of the NMOS transistor has a low voltage level, the NMOS transistor may be turned off. For example, if a signal applied to the control electrode of the NMOS transistor has a high voltage level, the NMOS transistor may be turned on.

Each of the fourth to sixth transistors T4, T5, and T6 may be implemented using a PMOS transistor. In this case, a low voltage level may be an enable level, and a high voltage level may be a disable level. For example, if a signal applied to a control electrode of the PMOS transistor has a low voltage level, the PMOS transistor may be turned on. For example, if a signal applied to the control electrode of the PMOS transistor has a high voltage level, the PMOS transistor may be turned off. In other words, the enable level and the disable level may be determined based on the type of transistor.

Figure 9:
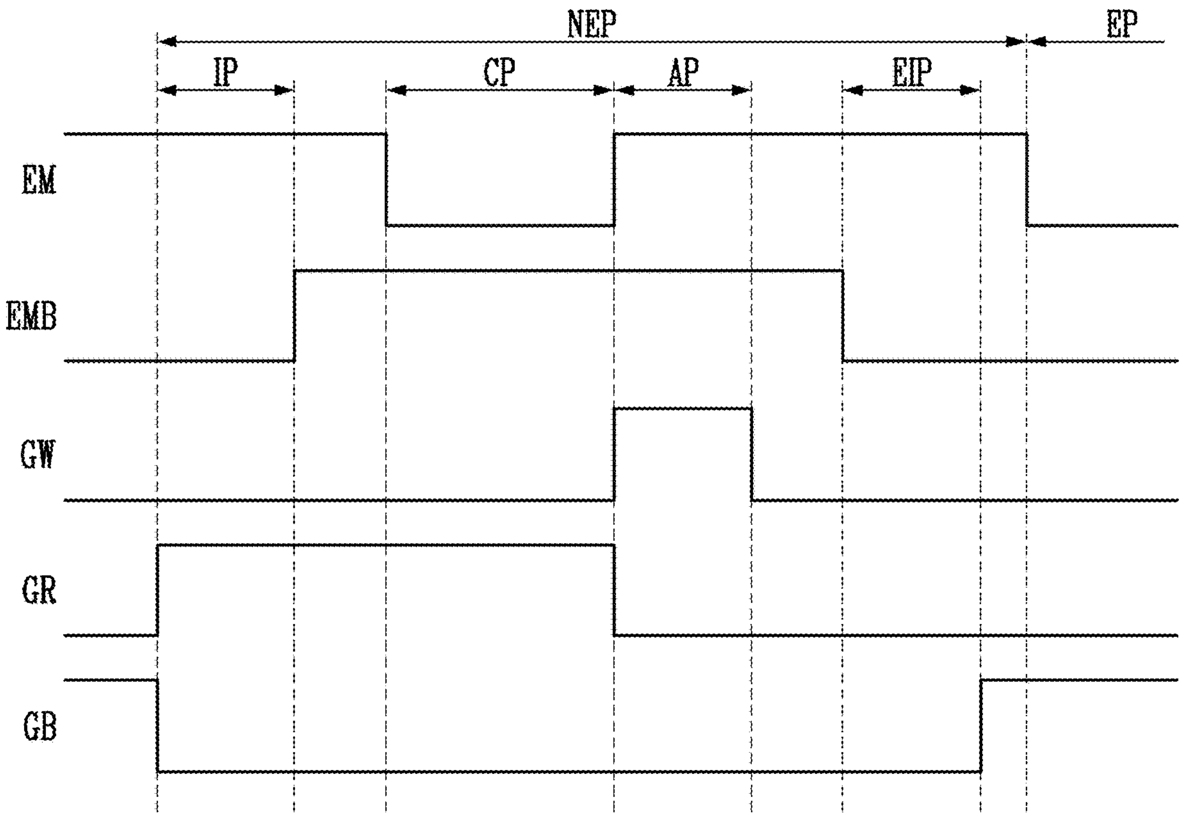
FIG. 9 is a timing diagram illustrating an example of driving the sub-pixel shown in FIG. 8 in the display device.

FIG. 9 is a timing diagram illustrating an example of driving the sub-pixel shown in FIG. 8 in the display device.

The timing diagram according to the present embodiments is substantially the same as the timing diagram of FIG. 3, other than the third gate signal GB; therefore, identical or similar components are denoted by the same reference numerals and symbols, and some redundant explanation thereof may be omitted.

Referring to FIG. 9, each frame may include a non-emission period NEP and an emission period EP. For example, the light emitting element LD may emit light during the emission period EP. The non-emission period NEP may include an initialization period IP, a compensation period CP, an addressing period AP, and an emission initialization period EIP.

During the initialization period IP in one frame, the second gate signal GR, the third gate signal GB, and the emission bias signal EMB may each have an enable level, and the third, fourth, and sixth transistors T3, T4, and T6 may be turned on. Furthermore, in the initialization period IP, the first gate signal GW and the emission signal EM may each have a disable level, and the second and fifth transistors T2 and T5 may be turned off.

During the compensation period CP following the initialization period IP in one frame, the second gate signal GR, the third gate signal GB, and the emission signal EM may each have an enable level, and the third to fifth transistors T3, T4, and T5 may be turned on. Furthermore, during the compensation period CP, the first gate signal GW and the emission bias signal EMB may each have a disable level, and the second and sixth transistors T2 and T6 may be turned off.

During the addressing period AP following the compensation period CP in one frame, the first gate signal GW and the third gate signal GB may each have an enable level, and the second and fourth transistors T2 and T4 may be turned on. Furthermore, during the addressing period AP, the second gate signal GR, emission signal EM, and the emission bias signal EMB may each have a disable level, and the fifth and sixth transistors T5 and T6 may be turned off.

During the emission initialization period EIP following the addressing period AP in one frame, each of the third gate signal GB and the emission bias signal EMB may have an enable level, and the fourth and sixth transistors T4 and T6 may be turned on. Furthermore, in the emission initialization period EIP, the first gate signal GW, the second gate signal GR, and the emission signal EM may each have a disable level, and the second, third, and fifth transistors T2, T3, and T5 may be turned off.

During the emission period EP, each of the emission signal EM and the emission bias signal EMB may have an enable level, and the fifth and sixth transistors T5 and T6 may be turned on.

Figure 10:
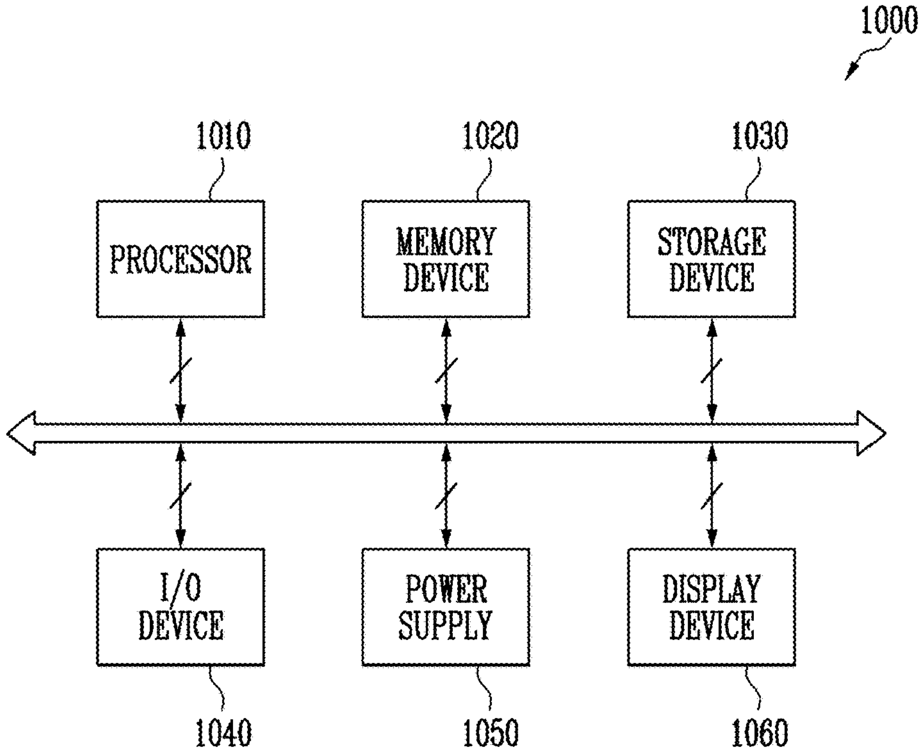
FIG. 10 is a block diagram illustrating an electronic device according to some embodiments of the present disclosure.
Figure 11:
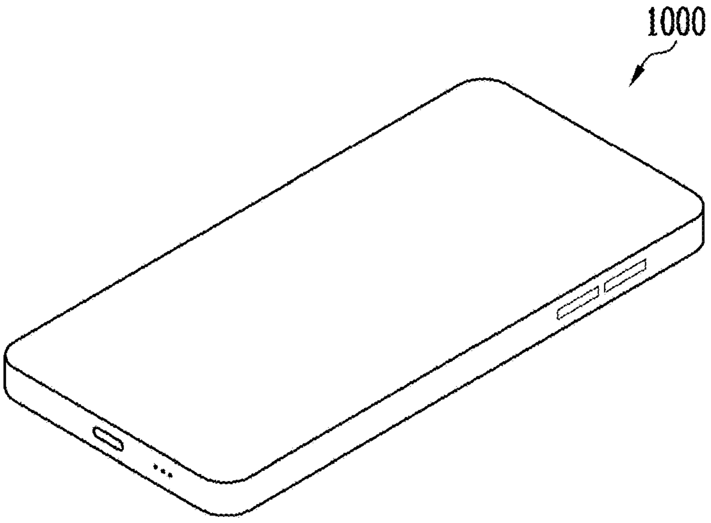
FIG. 11 is a diagram illustrating an example where the electronic device of FIG. 10 is implemented as a smartphone.

FIG. 10 is a block diagram illustrating an electronic device 1000 according to some embodiments of the present disclosure. FIG. 11 is a diagram illustrating an example where the electronic device 1000 of FIG. 10 is implemented as a smartphone.

Referring to FIGS. 10 to 11, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may further include various ports for communication with a video card, a sound card, a memory card, a USB device, or other systems. According to some embodiments, as illustrated in FIG. 11, the electronic device 1000 may be implemented as a smartphone. However, the aforementioned examples are illustrative, and the electronic device 1000 is not limited to the aforementioned examples. For example, the electronic device 1000 may be implemented as a cellular phone, a video phone, a smartpad, a smartwatch, a tablet PC, a navigation device for vehicles, a computer monitor, a laptop computer, a head-mounted display device, and so on.

The processor 1010 may perform specific calculations or tasks. According to some embodiments, the processor 1010 may be a microprocessor, a central processing unit, an application processor, or the like. The processor 1010 may be connected to other components through an address bus, a control bus, a data bus, and the like. According to some embodiments, the processor 1010 may be connected to an expansion bus such as a peripheral component interconnect (PCI) bus.

The memory device 1020 may store data needed to perform the operation of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, a mobile DRAM device, and so on.

The storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. According to some embodiments, the display device 1060 may be included in the I/O device 1040.

The power supply 1050 may supply power needed to perform the operation of the electronic device 1000. For example, the power supply 1050 may be a power management integrated circuit (PMIC).

The display device 1060 may display an image corresponding to visual information of the electronic device 1000. Here, the display device 1060 may be an organic light emitting display device or a quantum dot light emitting display device, but is not limited thereto. The display device 1060 may be connected to other components through the buses or other communication links.

A display device according to some embodiments of the present disclosure is configured such that before a light emitting element emits light, the influence of a capacitor connected to the light emitting element may be relatively reduced, thereby being relatively insensitive to noise.

However, the characteristics of embodiments according to the present disclosure are not limited to the above-described characteristics, and various modifications are possible without departing from the spirit and scope of embodiments according to the present disclosure.

What is claimed is:

1. A sub-pixel, comprising:

a first transistor including a control electrode connected to a first node, the first transistor being connected between a second node and a third node configured to receive a first power voltage, and configured to generate driving current;

a first capacitor connected between the first node and the second node;

a second capacitor connected between the second node and a fourth node configured to receive an initialization voltage in response to a first gate signal;

a second transistor configured to provide a data voltage to the first node in response to a second gate signal; and a light emitting element configured to receive the driving current and emit light, and including a first electrode connected to the fourth node, and a second electrode configured to receive a second power voltage.

2. The sub-pixel according to claim 1, further comprising a third transistor configured to provide a reference voltage to the control electrode of the first transistor in response to a third gate signal.

3. The sub-pixel according to claim 2, further comprising a fourth transistor configured to provide the initialization voltage to the fourth node in response to the first gate signal.

4. The sub-pixel according to claim 3, further comprising:

a fifth transistor configured to provide the first power voltage to the third node in response to an emission signal; and a sixth transistor configured to connect the second node to the fourth node in response to an emission bias signal.

5. The sub-pixel according to claim 4, wherein each of the first to fourth transistors comprises an n-channel metal oxide semiconductor (NMOS) transistor, and each of the fifth and sixth transistors comprises a p-channel metal oxide semiconductor (PMOS) transistor.

6. The sub-pixel according to claim 4, wherein each of the first to third transistors comprises an n-channel metal oxide semiconductor (NMOS) transistor, and each of the fourth to sixth transistors comprises a p-channel metal oxide semiconductor (PMOS) transistor.

7. The sub-pixel according to claim 4, wherein during a period between a first time point after the data voltage is provided to the first node and a second time point before the light emitting element emits light, both the first electrode and the second electrode of the second capacitor are configured to receive the initialization voltage, and wherein the second time point follows the first time point.

8. The sub-pixel according to claim 4, wherein one frame includes a non-emission period and an emission period, wherein the non-emission period includes an addressing period in which the data voltage is provided to the first node, and an emission initialization period following the addressing period, and wherein in the emission initialization period, both the first electrode of and the second electrode of the second capacitor have the initialization voltage.

9. The sub-pixel according to claim 8, wherein during the emission initialization period, each of the first gate signal and the emission bias signal has an enable level, and each of the second gate signal, the third gate signal, and the emission signal has a disable level.

10. The sub-pixel according to claim 9, wherein during the addressing period, each of the second gate signal and the first gate signal has an enable level, and each of the third gate signal, the emission signal, and the emission bias signal has a disable level.

11. The sub-pixel according to claim 10, wherein the non-emission period further includes an initialization period and a compensation period following the initialization period, wherein during the initialization period, each of the third gate signal, the first gate signal, and the emission bias signal has an enable level, and each of the second gate signal and the emission signal has a disable level, and wherein the addressing period follows the compensation period.

12. The sub-pixel according to claim 11, wherein during the compensation period, each of the third gate signal, the first gate signal, and the emission signal has an enable level, and each of the second gate signal and the emission bias signal has a disable level.

13. A display device, comprising:

a display panel including a sub-pixel; and a display panel driver configured to drive the display panel, wherein the sub-pixel comprises:

a first transistor including a control electrode connected to a first node, the first transistor being connected between a second node and a third node configured to receive a first power voltage, and configured to generate driving current;

a first capacitor connected between the first node and the second node;

a second capacitor connected between the second node and a fourth node configured to receive an initialization voltage in response to a first gate signal;

a second transistor configured to provide a data voltage to the first node in response to a second gate signal; and a light emitting element configured to receive the driving current and emit light, and including a first electrode connected to the fourth node, and a second electrode configured to receive a second power voltage.

14. The display device according to claim 13, wherein the sub-pixel further comprises:

a third transistor configured to provide a reference voltage to the control electrode of the first transistor in response to a third gate signal; and a fourth transistor configured to provide the initialization voltage to the fourth node in response to the first gate signal.

15. The display device according to claim 14, wherein the sub-pixel further comprises:

a fifth transistor configured to provide the first power voltage to the third node in response to an emission signal; and a sixth transistor configured to connect the second node to the fourth node in response to an emission bias signal.

16. The display device according to claim 15, wherein one frame includes a non-emission period and an emission period, wherein the non-emission period includes an addressing period in which the data voltage is provided to the first node, and an emission initialization period following the addressing period, and wherein in the emission initialization period, both the first electrode of and the second electrode of the second capacitor have the initialization voltage.

17. The display device according to claim 16, wherein during the emission initialization period, each of the first gate signal and the emission bias signal has an enable level, and each of the second gate signal, the third gate signal, and the emission signal has a disable level.

18. The display device according to claim 17, wherein during the addressing period, each of the second gate signal and the first gate signal has an enable level, and each of the third gate signal, the emission signal, and the emission bias signal has a disable level.

19. The display device according to claim 18, wherein the non-emission period further includes an initialization period and a compensation period following the initialization period, wherein during the initialization period, each of the third gate signal, the first gate signal, and the emission bias signal has an enable level, and each of the second gate signal and the emission signal has a disable level, and wherein the addressing period follows the compensation period.

20. An electronic device comprising:

a processor configured to generate input image data and a control signal; and a display device configured to display an image based on the input image data and the control signal, to include a sub-pixel;

the sub-pixel comprising:

a first transistor including a control electrode connected to a first node, the first transistor being connected between a second node and a third node configured to receive a first power voltage, and configured to generate driving current;

a first capacitor connected between the first node and the second node;

a second capacitor connected between the second node and a fourth node configured to receive an initialization voltage in response to a first gate signal;

a second transistor configured to provide a data voltage to the first node in response to a second gate signal; and a light emitting element configured to receive the driving current and emit light, and including a first electrode connected to the fourth node, and a second electrode configured to receive a second power voltage.

* * * * *